United States Patent [19]
Thomas

[11] Patent Number: 6,075,797
[45] Date of Patent: Jun. 13, 2000

[54] METHOD AND SYSTEM FOR DETECTING MOBILITY OF A WIRELESS-CAPABLE MODEM TO MINIMIZE DATA TRANSFER RATE RENEGOTIATIONS

[75] Inventor: Nicholas A. Thomas, Midvale, Utah

[73] Assignee: 3Com Corporation, Santa Clara, Calif.

[21] Appl. No.: 08/953,757

[22] Filed: Oct. 17, 1997

[51] Int. Cl.[7] .................................................. H04J 3/16
[52] U.S. Cl. ........................................ 370/468; 370/310
[58] Field of Search .................................... 370/241, 252, 370/310, 328, 468, 465; 375/222, 223; 455/557, 67.3, 226.3

[56] References Cited

U.S. PATENT DOCUMENTS

| | | | |
|---|---|---|---|
| 5,257,397 | 10/1993 | Barzegar et al. ................ | 455/422 |
| 5,297,186 | 3/1994 | Dong ............................... | 375/222 |
| 5,394,392 | 2/1995 | Scott .............................. | 370/295 |
| 5,592,491 | 1/1997 | Dinkins .......................... | 370/277 |
| 5,862,141 | 1/1999 | Trotter .......................... | 370/468 |
| 5,901,142 | 5/1999 | Averbuch et al. ............... | 370/329 |

*Primary Examiner*—Huy D. Vu
*Assistant Examiner*—Alexander Boakye
*Attorney, Agent, or Firm*—Workman, Nydegger & Seeley

[57] ABSTRACT

A method and apparatus for revising and minimizing renegotiations of a data transfer rate for wireless-capable modems transceiving data over a wireless communication channel via a wireless transceiver. When a wireless-capable modem presents a favorable signal-to-noise ratio resulting from a stationary or near stationary position, higher data transfer rates are employed for data exchange. When varying signal-to-noise ratios are detected designating mobility of the wireless-capable modem, then a reduced mobility data transfer rate is employed to provide a sustained data transfer rate for the duration of the mobility without oscillating between differing data transfer rates thereby incurring the significant renegotiation down-time due to fluctuating signal quality. The mobility detection and reduction in the data transfer rate to a more reliable level during mobility is performed automatically without user intervention.

17 Claims, 7 Drawing Sheets

METHOD AND SYSTEM FOR DETECTING MOBILITY OF A WIRELESS-CAPABLE MODEM TO MINIMIZE DATA TRANSFER RATE RENEGOTIATIONS

BACKGROUND OF THE INVENTION

1. The Field of the Invention

This invention relates generally to data communication systems employing a wireless communication channel. More particularly, the invention relates to minimizing data transfer rate renegotiations for transfer of data between modems.

2. Present State of the Art

Telecommunication systems traditionally facilitate the exchange of data between a data generator and a data recipient over a fixed or hard-wired communication channel. Such communication channels have taken forms such as local or wide area networks having hard-wired or coaxially-coupled links between data generators and data recipients such as computers. Even more popular than the aforementioned networks, the standard telephone network provides yet another hard-wired communication channel through which data may propagate. Such hard-wired communications channels typically exhibit very high and stable signal-to-noise ratios due to limited and stable interference parameters.

In a hard-wired or land line communication channel, a data generator and a data recipient negotiate, as a result of the ambient signal-to-noise ratio present at the commencement of a communication session, a data transfer rate for use over the existing wired communication channel. Upon the completion of a successful data transfer rate negotiation, the data generator transmits data at the negotiated data transfer rate to the data recipient via the wired communication channel. Due to the stable nature of wired communication channels, the data generator and data recipient continue to exchange data at the negotiated date transfer rate while the signal-to-noise ratio remains hospitable. When transient noise or degeneration of the wired communication channel occurs, the data generator and data recipient may renegotiate a more conducive data transfer rate. Such data transfer renegotiation processes such as those defined by popular standards, V32, V32bis, and X2, facilitate the renegotiation of a data transfer rate during an on-going communication session. However, renegotiation processes at the physical connection layer of the communication channel may require a retraining duration in excess of 30 seconds including the reestablishment of error correction and data compression protocols. In a highly stable wired communication channel where renegotiation processes are rare, the renegotiation time may easily be compensated for by the enhanced bandwidth or reliable channel resulting from the renegotiation process.

Conversely, wireless communication channels, such as those employed by cellular and other mobile communication technologies, exhibit a more divergent signal-to-noise ratio profile. As wireless communication channels freely propagate with other wireless communication channels through a shared propagation medium, such communication channels become susceptible to interfering signals and propagation conditions. While signal-to-noise ratios between a stationary wireless transmitter and a stationary wireless receiver may exhibit reasonably consistent signal-to-noise ratios, any mobility of either a wireless transmitter or receiver alters the propagation path through which data information must pass. Such perturbances to a communication channel affects the signal-to-noise ratio as perceived between the wireless transmitter and wireless receiver.

A data generator and recipient, such as personal computers, may employ a modem for modulation or demodulation of data prior to transmission or following reception of transmitted data. In an architecture where a modem selects a wireless communication channel through which to transmit and receive data, the modem performs a data transfer rate negotiation similar to that performed in a land or wired communication channel topology. The data transmitter and receiver engage in a data transfer rate negotiation process to determine a conducive data transfer rate for the then-present signal-to-noise ratio. For stationary modems and wireless transceivers, a reasonably stable signal-to-noise ratio may be perceived. In such an environment, a modem connected with a wireless transmitter may dispatch data to a wireless receiver, also connected to a demodulating modem, with infrequent renegotiation of the data transfer rate. However, when either a wireless transmitter or wireless receiver become mobile, the signal-to-noise ratio exhibited across the wireless communication channel varies greatly depending upon, among other things, the proximity of the wireless transceiver to the corresponding base station and the presence of interfering structures. In a cellular wireless communication environment, a mobile wireless transceiver traversing a minimal geographical area may approach and recede from numerous base stations. Such a change in the physical proximity of the wireless transceiver to the base station manifests a signal-to-noise ratio profile having a frequency of change dependent upon the relative mobility of the wireless transceiver.

Such a fluctuating signal-to-noise ratio requires that the transmitting modem and the receiving modem renegotiation a data transfer rate conducive to the then-present signal-to-noise ratio. In such a dynamic mobile environment, frequent data transfer rate renegotiations have been noted to occupy a substantial amount of time and bandwidth of the wireless communication channel between the data transmitter and receiver. While some prior art solutions have allowed a user to request the modem invoke a conservative data transfer rate for such dynamic communication channels, the solutions have required user intervention to configure the modem to conform with such a conservative or default data transfer rate. Such prior art solutions burden the user to notify the modem of the request for a conservative data transfer rate and furthermore locks the data transfer rate into a conservative value even when the wireless transmitter and receivers revert to a stationary, and hence a continuous signal-to-noise ratio, configuration.

Thus, what is needed is a method and system for revising an minimizing renegotiations of a data transfer rate when variations to the mobility of the modem, and hence wireless transceiver, is detected. Furthermore, what is desired is a method and system for providing automatic and continuous detection of the mobility of the modem thereby precluding intermittent renegotiation resulting from interim changes in signal-to-noise ratios.

SUMMARY AND OBJECTS OF THE INVENTION

It is an object of the present invention to provide a method and apparatus for revising and minimizing renegotiations of a data transfer rate in a data communication system employing a wireless-capable modem when variations to the mobility of the wireless-capable modem are detected.

Another object of the present invention is to provide a method and apparatus for detecting mobility of a wireless-capable modem from an analysis of the variations in a signal-to-noise ratio as detected in received data at the wireless-capable modem.

A still further object of the present invention is to provide a method and system for detecting mobility of a wireless-capable modem from a statistical analysis of the signal-to-noise ratio.

Yet another object of the present invention is to provide a method and system for detecting mobility of a wireless-capable modem by collecting a discrete time analysis of signal-to-noise samples and performing a frequency analysis of the samples.

A yet further object of the present invention is to provide a method and system for renegotiating a data transfer rate when mobility of a wireless-capable modem is detected.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. To achieve the objects, and in accordance with the invention as embodied and broadly described herein, a method and system for revising and minimizing renegotiations of a data transfer rate when variations to the mobility of the wireless-capable modem are detected is provided.

A data communication system employs a wireless-capable modem for modulating and demodulating data for transmission over a wireless communication channel. The wireless-capable modem when coupled with a wireless transceiver may migrate at will throughout the system. Migration of the wireless-capable modem, and by affinity the wireless transceiver, presents variations in signal quality to the interfacing base station. Variations in signal quality present varying bandwidth transmission capacity between the wireless transceiver and the base station. A data transfer rate for use in a communication session is determined and minimally revised, depending upon the level of mobility detected during the communication session, to minimize the significant amount of time associated with protracted data rate renegotiation procedures.

In a preferred embodiment of the present invention, the data rate selection process is executed within the wireless-capable modem. The mobility status of the modem is initialized to denote a stationary situs of the wireless-capable modem. While connection of a wireless transceiver to a wireless-capable modem facilitates establishment of a wireless communication channel, such a connection does not dictate mobility resulting in a varying level of channel quality. The present invention facilitates higher data transfer rates for wireless communication channels having stable, favorable signal-to-noise ratios while detecting mobility and establishing a more robust lower data transfer rate for varying signal quality configurations.

The processing and modem data rate selection process executes a mobility detection process to continually evaluate the signal quality of the received signal thereby detecting a change in mobility. The mobile detection process may be executed using a number of techniques such as statistical analysis, discrete time analysis, and other analysis techniques. In one preferred embodiment, the mobile detection process evaluates a measured signal-to-noise ratio sample for comparison against a specified signal-to-noise ratio mean and variance. When a sufficient number of deviations from the mean and variance has occurred, or, alternatively, if immobility or stationary status is returned, then the mobility status is changed accordingly. In another preferred embodiment, the mobile detection process performs a discrete time and analysis wherein the signal-to-noise ratio is calculated and evaluated in the frequency domain to determine the relative frequencies associated with the variations in the signal-to-noise ratio. When excursions of the signal-to-noise ratio exceed a threshold, the mobility status is also changed accordingly.

Following the mobility detection process, the mobility status is evaluated to detect a change in status. When a change in the mobility status is not detected, execution returns to re-execute the mobile detection process, however, when a change in the mobility status is detected, the present mobility status is dealt with accordingly. For example, when the mobility status is detected as being immobile or near stationary, the higher maximized data rate is renegotiated. Furthermore, when the present mobility status designates the wireless-capable modem as being mobile, the data transfer rate is modified through a data transfer rate renegotiation process wherein the data transfer rate assumes the mobile default value.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention embodies within its scope both methods and systems for revising and minimizing renegotiation of a data transfer rate when variations to the mobility of a wireless-capable modem are detected. The purpose of this invention is to allow a user to obtain an improved data transfer rate conducive to the level of mobility of the modem without requiring user intervention to explicitly select a reduced data transfer rate for mobile data transfers.

Also, as used herein, a wireless-capable modem, in one preferred embodiment, includes a controller or processor for executing software instructions contained within software processes or modules. Such processing may also be facilitated internally by the digital signal processor or externally by a separate microcontroller or microprocessor, or externally by the host system.

Figure 1:
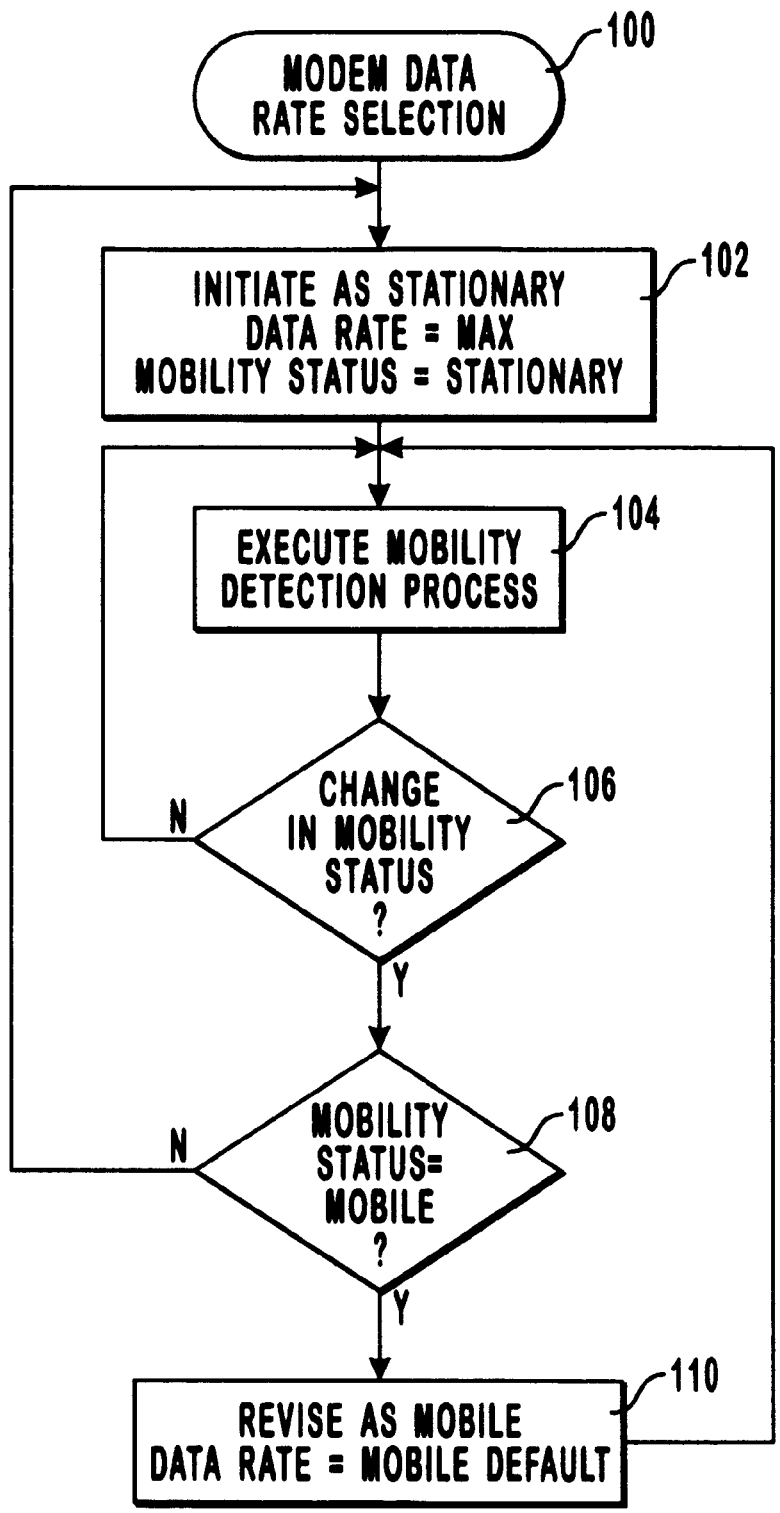
FIG. 1 is a flowchart of a modem data rate selection process, in accordance with a preferred embodiment of the present invention.

FIG. 1 depicts a simplified flowchart for a data transfer rate selection by a wireless-capable modem. In one preferred embodiment, a modem data rate selection process 100 is carried out by the processing means of the wireless-capable modem. As briefly described above, the processing or software execution capability of the wireless-capable modem may be resident to the modem in the form of a microcontroller, microprocessor or digital signal processor, or software execution in modem data rate selection process 100 may also be carried out by the host system as in the case of a host signal processing implementation of a modem.

A step 102 specifies the modem as being stationary until modem mobility is detected. At the commencement of a communication session, the preferred embodiment of the present invention defaults to a stationary status wherein the data transfer rate specified in the data transfer rate negotiation takes the form of the maximum possible data rate sustainable by the wireless-capable modem. In the present embodiment, two variables are maintained and varied throughout the entire process. A mobility status variable assumes the domain of a maximum possible data rate, specifying a non-moving or sufficiently stationary modem and a mobile default data transfer rate, specifying a conservative data transfer rate conducive to a mobile environment.

The processing and modem data rate selection process 100 then passes to a step 104 wherein the process executes the mobility detection process. The mobile detection process may be carried out by a number of techniques such as statistical analysis, discrete time analysis, and other analysis techniques known by those of skill in the art. In one preferred embodiment, execute mobile detection process 104 comprises the process as detailed in FIG. 2 wherein a signal-to-noise ratio sample is compared against a specified signal-to-noise ratio mean and variance. When a sufficient number of deviations has occurred, or, alternatively, if immobility or stationary status is returned, then the mobility status is changed accordingly.

Figure 3:
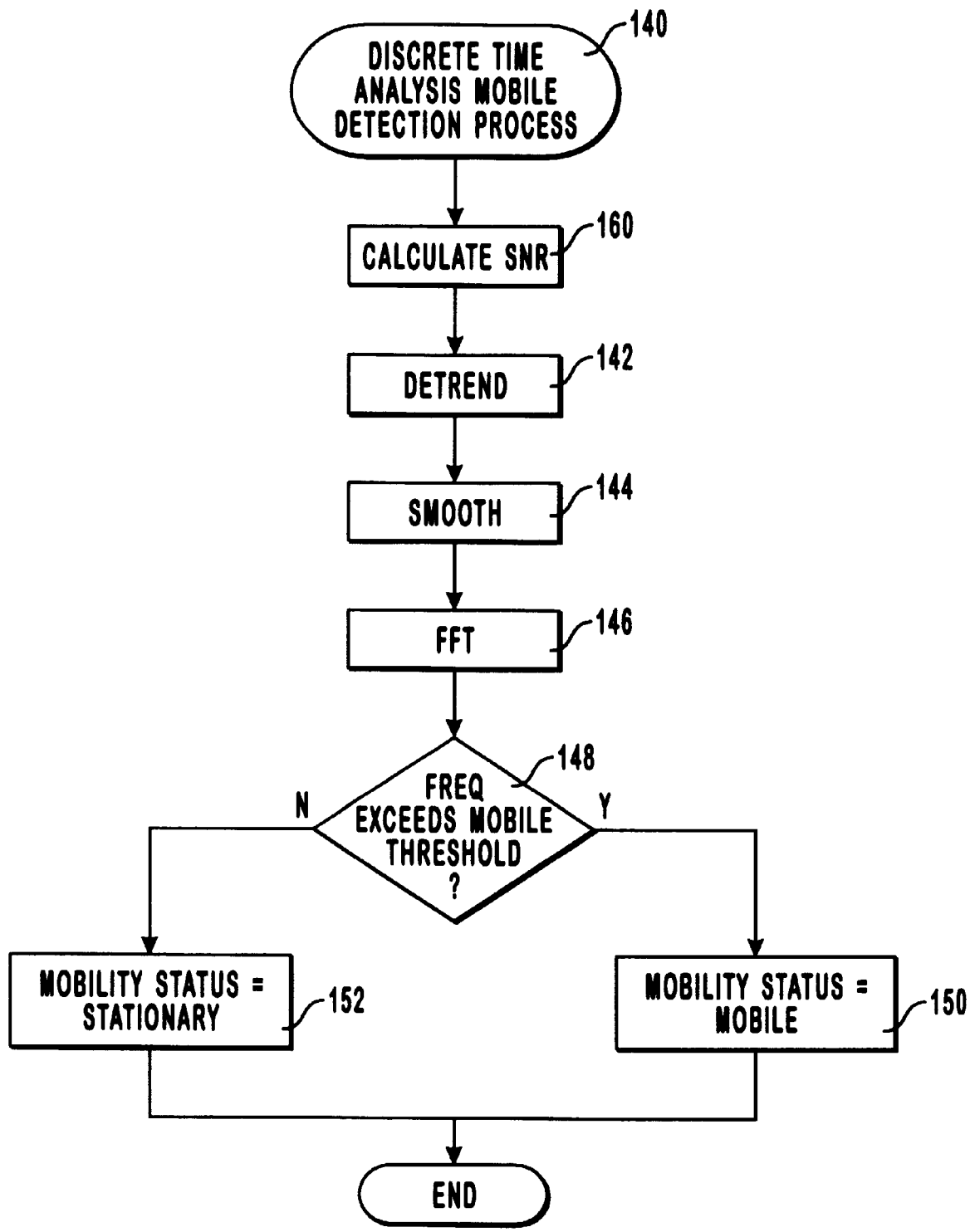
FIG. 3 is a flowchart of a discrete time analysis mobile detection process in accordance with an alternate embodiment of the present invention.

In another preferred embodiment, execute mobile detection process 104 takes the form of a discrete time analysis mobile detection process as detailed in FIG. 3. Under such an embodiment, the signal-to-noise ratio is calculated and evaluated in the frequency domain to determine the relative frequencies associated with the variations in the signal-to-noise ratio. Under such an embodiment, when the excursions of the signal-to-noise ratio exceed a threshold, the mobility status is also changed accordingly.

Modem data rate selection process 100 further comprises a query task 106 for evaluating a change in the mobility status. When a change in the mobility status is not detected, execution returns to re-execute the mobile detection process 104. However, when query task 106 detects a change in the mobility status, processing passes to yet another query task 108 for a determination of the present mobility status. When the mobility status is detected as not being sufficiently mobile, processing returns to task 102 for reinstitution for the higher maximized data rate. However, when query task 108 detects the present mobility status as signifying mobility of the modem, processing passing to a task 110 wherein the data transfer rate is modified through a data transfer rate renegotiation process with the data transfer rate assuming the mobile default value. Calculation of the mobile default transfer rate is not further discussed here as those of skill in the art are aware of techniques, even empirical techniques, for determining a robust mobile default data transfer rate. Following step 110, processing returns to execute mobile detection process 104 for a continued evaluation of changes to the signal-to-noise ratio. While a specific order has been presented for modem data rate selection process 100, other ordering and selection of variables may be employed for carrying out the data rate selection process. Such alternate ordering is considered to be within the scope of the present invention.

Figure 2:
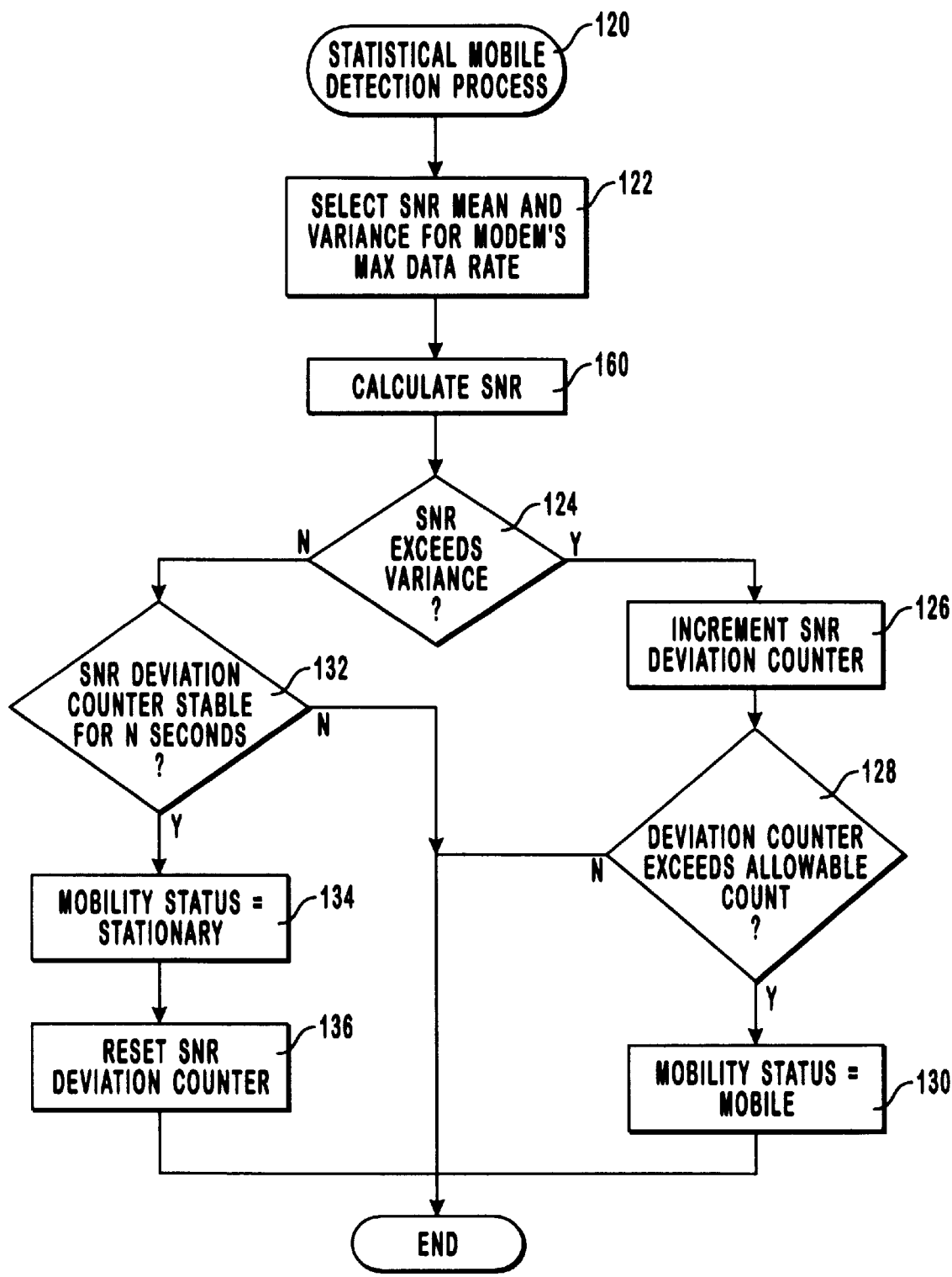
FIG. 2 is a flowchart of a statistical mobile detection process, in accordance with a preferred embodiment of the present invention.

FIG. 2 depicts a flowchart for the mobile detection process, in accordance with a preferred embodiment of the present invention. Statistical mobile detection process 120 provides a more simplified and less processing intensive implementation for detecting mobility of the wireless-capable modem than other more computationally intense implementations.

Statistical mobile detection process 120 includes a task 122 for selecting a signal-to-noise ratio mean and variance corresponding with the modem's maximum data rate for given propagation conditions. Such a mean and variance combination provides a threshold value for a signal-to-noise ratio range within which a modem's signal-to-noise ratio must remain in order to remain transmitting at the maximum data transfer rate.

A calculate signal-to-noise ratio task 160 follows in which data samples are measured and evaluated to determine an error rate. Calculate signal-to-noise ratio task 160 is furthered detailed in FIG. 4. While the preferred embodiment for calculating the signal-to-noise ratio is exhibited in FIG. 4, other implementations known by those of skill in the art may also be used to calculate the signal-to-noise ratio used in the present invention.

A query task 124 evaluates the signal-to-noise ratio returned by calculate signal-to-noise ratio task 160. When query task 124 detects that the signal-to-noise ratio exceeds the mean and variance, then a task 126 increments a signal-to-noise ratio deviation counter. The signal-to-noise ratio deviation counter is further described in FIG. 6 and generally provides a summing accumulator for tracking the number of excursions of the signal-to-noise ratio beyond the mean and variance boundary.

A query task 128 compares the count in the deviation counter with an allowable count or threshold value. When query task 128 determines that the count of the signal-to-noise ratio deviation counter exceeds the allowable count, a task 130 asserts the mobility status to reflect the mobile nature of the wireless-capable modem.

Returning to query task 124, when the signal-to-noise ratio does not exceed the variance, processing passes to a query task 132 to make a determination of whether the wireless-capable modem has shifted between mobile and stationary. Such a determination, in the present embodiment, is performed by evaluating the stability of the signal-to-noise ratio deviation counter. When the signal-to-noise ratio deviation counter remains stable for a period of N seconds, then statistical mobile detecting process 120 determines that the modem has become stationary and in task 134 asserts the mobility status to reflect the stationary or near stationary condition of the wireless-capable modem. When a stationary status is achieved, a task 136 resets the signal-to-noise ratio deviation counter to prepare it for further and subsequent evaluations of the signal-to-noise ratio.

Figure 4:
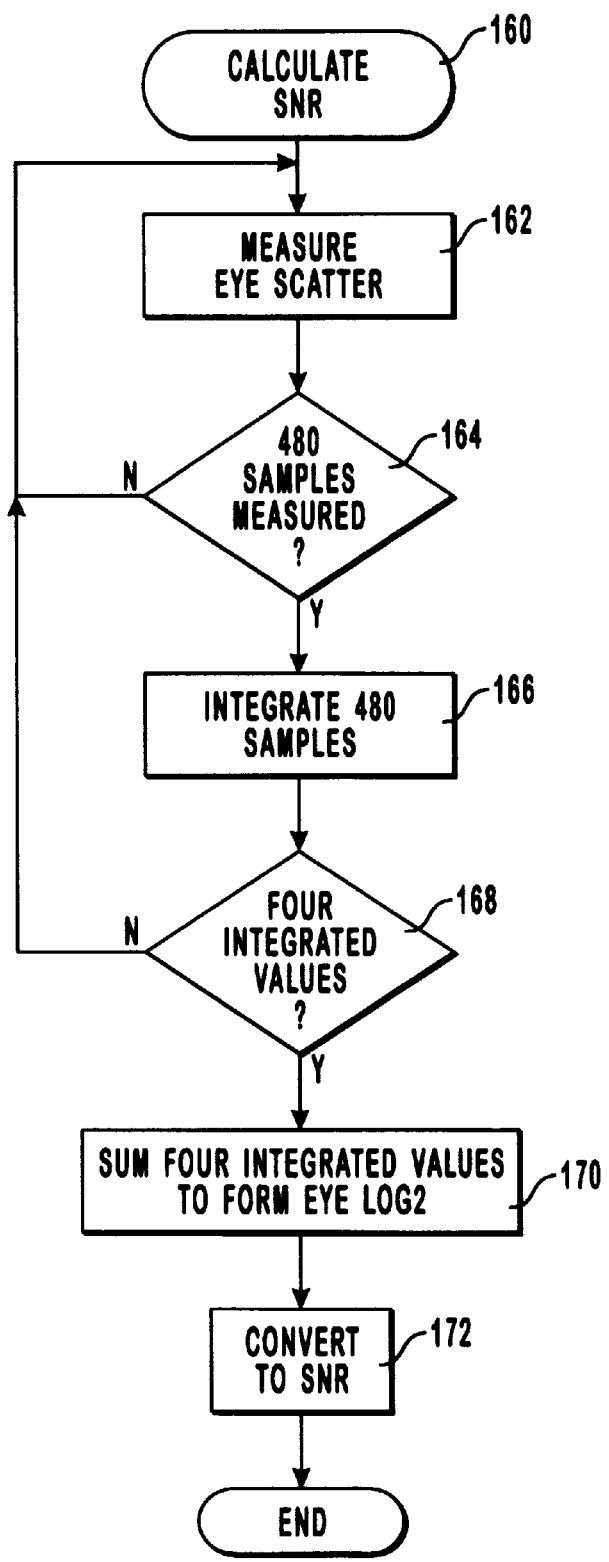
FIG. 4 is a flowchart of a process for calculating the signal-to-noise ratio, in accordance with a preferred embodiment of the present invention.

FIG. 3 is a simplified flowchart depicting the mobile detecting process 104 of (FIG. 1) taking the form of another preferred embodiment wherein a discrete time analysis is performed. Discrete time analysis mobile detection process 140 performs a mobile detection process for detecting mobility of the modem by an evaluation of the frequency of change of the signal-to-noise ratio. A task 160 calculates a signal-to-noise ratio using a process as depicted in FIG. 4 wherein a series of samples are evaluated to determine a value for use in computation. In the present embodiment, the calculated signal-to-noise ratio is further processed or refined prior to converting to the frequency domain. A task 142 performs a detrend process on the sampled signal-to-noise ratio in order to remove smaller variations in the signal-to-noise ratio and generally flatten the signal into a more continuous form. Subsequently, a task 144 performs a smoothing function on the detrended signal-to-noise ratio values to remove yet additional discontinuities associated with sampling. Smoothing is performed by windowing portions of the discrete time series to transform the discrete time series into a more periodic or continuous waveform prior to performing a Fourier transform. Smoothing further removes spurious discontinuities associated with the discrete nature of the sampled signal-to-noise ratio. Those skilled in the art of digital signal processing are familiar with the detrending and smoothing operations exhibited in tasks 142 and 144, respectively.

A task 146 performs a fast Fourier transform (FFT) on the detrended and smoothed signal-to-noise ratios for converting the signal-to-noise ratio from a discrete time domain to a frequency domain for subsequent evaluation. Such a conversion to the frequency domain generates a frequency spectrum from which an evaluation of the variations of the signal-to-noise ratio may be performed. Small variations in the frequency of the signal-to-noise ratio denote a more stable operating environment conducive to a higher data transfer rate while higher frequency spectrum components relate more directly to a more volatile operating environment characteristic of a mobile modem, therefore requiring a more reliable or reduced data transfer rate.

A query task 148 evaluates the frequency spectrum generated by task 146 against a mobility threshold to determine when a modem is sufficiently mobile as to justify a renegotiation of the data transfer rate. When the signal-to-noise ratio variation spectrum exceeds the threshold, a task 150 designates the present mobility status of the modem as being in a mobile state. Conversely, when a frequency evaluation of the signal-to-noise ratio variations denotes a low frequency variation below the designated threshold, a task 152 designates the present mobility status of the modem as being immobile or sufficiently immobile as to reliably exchange data at the higher data transfer rate.

While the present embodiment designates a specific order and specific digital signal processing techniques, those skilled in the art of digital signal processing will also recognize that other refining and transformation techniques may be employed for evaluating variations in the signal-to-noise ratio exhibited by the modem. Such alternative techniques are considered to be embraced by the scope of the present invention as depicted and described in FIG. 3.

FIG. 4 is a simplified flowchart depicting the calculation process for generating a signal-to-noise ratio for evaluation in the preceding processes, in accordance with the preferred embodiment of the present invention. While the present embodiment depicts a preferred embodiment, those skilled in the art will recognize that other embodiments for calculating signal-to-noise ratios are known and may be substituted for the present embodiment.

A task 162 measures the present eye scatter associated with data exchanges as received by the modem. Those skilled in the art recognize the eye scatter measurement as being a reliable measurement used in the evaluation of modulation techniques. The present invention provides a means for storing a series of eye scatter measurements for use in subsequent calculations. A query task 164 evaluates the quantum of eye scatter measurements for determining when a sufficient number of measurements have been retained for subsequent processing. In the present embodiment, the preferred number of samples for processing is 480. While more or less samples may be collected, the collection of 480 samples provides an adequate sampling for mobility magnitudes associated with automobile and other terrestrial vehicular travel.

Upon the collection of 480 eye scatter measurement samples, a task 166 integrates the 480 samples and retains the integrated samples as a value for subsequent processing. A query task 168 verifies the collection of four such integrated samples. A task 170 sums the four integrated values to form an eye log 2 value. The sum of the four integrated values or eye log 2 value is then converted to a signal-to-noise ratio value by a task 172. The signal-to-noise ratio is represented by the equation below wherein:

$$SNR=20*LOG(2)*[LOG2(8192*SRT320)-ACC[\text{in dB}]$$

where ACC is the normalized value of the eye scatter and is given by:

$$ACC=LOG2(SRT(\text{alpha})*N*S)-LOG2(S)$$

While the present embodiment depicts a specific method for calculating line quality or calculating a signal-to-noise ratio, other techniques may also be employed for the calculation of signal-to-noise ratio which equally generate a factor representative of a variation of the line integrity which results from a change in mobility of the physical location of the modem. Such alternate calculations or measurement of signal quality are also considered to be within the scope of the present invention.

Figure 5:
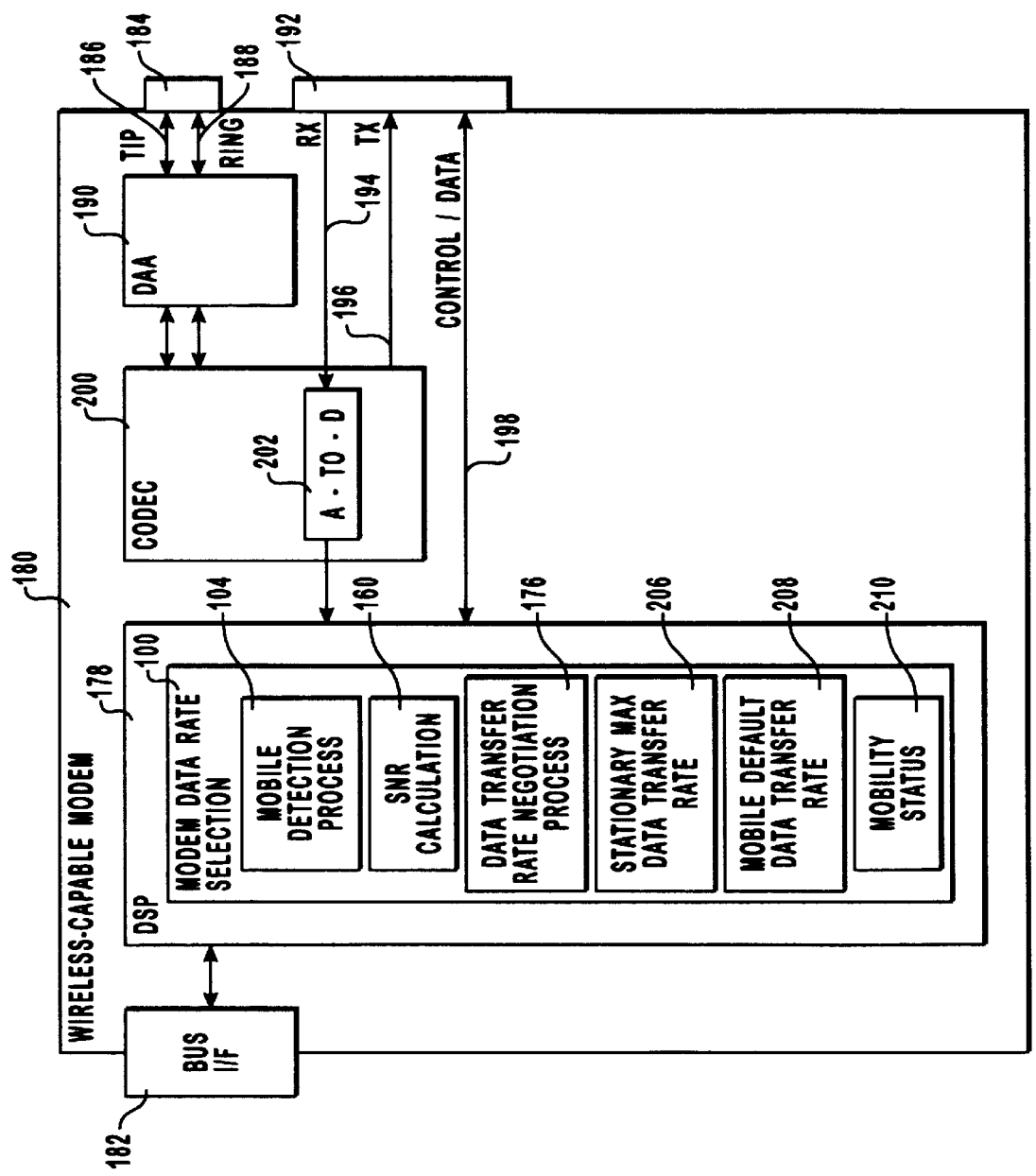
FIG. 5 is a simplified block diagram of a wireless-capable modem for revising and minimizing renegotiations of a data transfer rate, in accordance with a preferred embodiment of the present invention.

FIG. 5 is a simplified block diagram of a wireless capable modem capable of detecting mobility and revising and minimizing renegotiations associated with the change in a data transfer rate resulting from the variations in the mobility of the wireless-capable modem, in accordance with the preferred embodiment of the present invention. A wireless-capable modem 180 is comprised of, among other things, a bus interface 182 for integration with the host system, a CODEC 200, including an analog-to-digital conversion means 202, and a DAA 190 for providing an isolation boundary with the data communication network. DAA 190 provides an interface for tip signal 186 and ring signal 188 as exchanged with telephone network interface 184.

Wireless-capable modem 180 further comprises a processing means capable of executing the aforementioned processes for selecting a data transfer rate and for renegotiating data transfer rates upon the detection of mobility of the wireless-capable modem. By way of example, and not limitation, in FIG. 5 the processing means is depicted as a digital signal processor 178. Digital signal processor 178 includes functionality not only relating to signal processing such as modulation and demodulation of digital data, but also comprises the controller functionality associated with data rate selection, mobility evaluation, and signal-to-noise ratio calculations. It should be noted that other implementations of a processing means may partition the strictly signal processing aspects from the controller functionality by incorporating a second or separate microcontroller or microprocessor. Additionally, other embodiments of the present invention may incorporate a host signal processing environment wherein the control and signal processing functionality associated with a traditionally autonomous modem are incorporated or resident within the host system. Such host signal processing or native implementations of modems are also considered within the scope of the present invention.

The processing means is further comprised of a modem data rate selection means capable of establishing and revising data transfer rates and detecting the mobility associated with the wireless-capable modem, thereby minimizing renegotiations of data transfer rates resulting from variations in the mobility of the wireless-capable modem. In FIG. 5, the data rate selection means is illustrated as a collection of software modules and is illustrated as a modem data rate selection process 100. Data rate selection process 100 further includes a mobility detection process means for evaluating and determining variations in a transmission parameter such as a signal-to-noise ratio received by wireless capable modem 180. In FIG. 5, the mobility detection process means is illustrated as a mobile detection process 104 for performing the aforementioned mobile detection processes. In the preferred embodiment, mobile detection process 104 takes the form of a statistical mobile detection process 120 as illustrated in FIG. 2. In yet another preferred embodiment, mobile detection process 104 takes the form of a discreet time analysis mobile detection process 140 as illustrated and described above in the description relating to FIG. 3. Mobile detection process 104 may be implemented as a series of software modules executed by digital signal processor 178 or may be executed by the host system in an embodiment wherein the host cooperatively performs portions of the signal processing and control functions associated with traditional modular modems.

Modem data rate selection process 100 further comprises a means for calculating a signal-to-noise ratio. The means for calculating the signal-to-noise ratio performs measurements and evaluation on received data to determine errors in signal quality thereby making a signal-to-noise ratio calculation. By way of example, and not limitation, in FIG. 5 the means for calculating a signal-to-noise ratio is depicted as signal-to-noise ratio calculation process 160. Signal-to-noise ratio calculation process 160, in the preferred embodiment, executes the signal-to-noise ratio calculation as detailed in FIG. 4 above. It should be noted that while other signal-to-noise ratio calculations other than the one presented in FIG. 4 may be employed, such alternative calculations of a signal criterion, such as a bit error rate or other measurement of signal quality, may be employed and are considered to be within the scope of the present invention.

Modem data rate selection process 100 further comprises a data transfer rate negotiation process 176 for instituting an initial data transfer rate and for revising a data transfer rate from a stationary maximum data transfer rate to a mobile default data transfer rate when mobility of wireless capable modem 180 is detected through an evaluation of the variations in signal-to-noise ratios. Data transfer rate negotiation process 176, like the other processes and modules of modem data rate selection process 100, incorporates software modules or executable code for the carrying out and completion of such data rate selection and institution. It should be pointed out that data transfer rate negotiation process 176 may be comprised of standardized data transfer rate negotiation modules, known by those of skill in the art, such as standard physical layer protocols employing data transfer rate renegotiations.

Modem data rate selection process 100 further comprises at least two programmed fixed data transfer rates for use in transmitting and receiving data over a data communication system. When a communication channel is established with wireless capable modem 180, in the preferred embodiment, the data transfer rate is initialized as being in a stationary environment. A stationary maximum data transfer rate 206 provides such a programmed fixed data transfer rate for use in initialization and negotiation processes. Secondly, a mobile default data transfer rate 208 is comprised of a default data transfer rate for use when mobility is detected. The determination of which data transfer rate to employ, the stationary maximum data transfer rate 206 or the mobile default data transfer rate 208, is triggered by the setting of mobility status 10 as altered by mobile detection process 104.

FIG. 5 further illustrates an alternate configuration wherein wireless capable modem 180 is further comprised of a telephone network interface 192 having received signal 194, transmits signal 196 and control/data signal 198. Telephone network interface 192 provides a traditional interface for coupling directly with a wireless transceiver such as a cellular telephone. In such a configuration, telephone network interface 184 is not employed when telephone network interface 192 is utilized. While interfaces to wireless transceivers vary, typical wireless-capable modems employ a telephone network interface 192 having transmit/receive and control/data signals.

Figure 6:
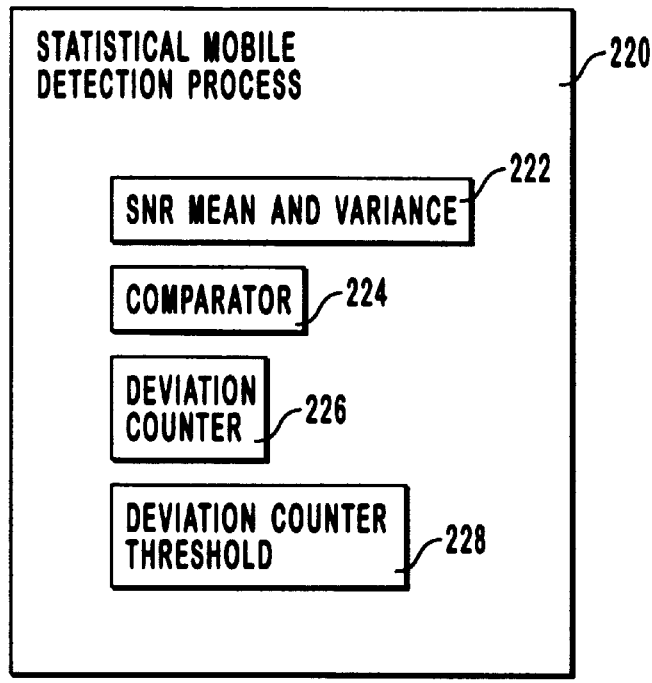
FIG. 6 is a simplified block diagram of a statistical mobile detection process, in accordance a preferred embodiment of the present invention.

FIG. 6 is a simplified block diagram of a statistical mobile detection process, in accordance with a preferred embodiment of the present invention. Statistical mobile detection process 220 comprises a means for statistically selecting a signal-to-noise ratio mean and variance from which mobility of a wireless-capable modem is determined. Such a means may take the form of a buffer or table wherein a calculated signal-to-noise ratio mean and a calculated signal-to-noise ratio variance are stored for subsequent reference and comparison with a presently measured signal-to-noise ratio. By way of example, in FIG. 6 the means for selecting a signal-to-noise ratio mean and variance as well as the buffering means for retaining a signal-to-noise ratio mean and variance is depicted as signal-to-noise ratio mean and variance 222. Furthermore, statistical mobile detection process 220 further comprises a means for comparing a signal-to-noise ratio against signal-to-noise ratio mean and variance 222. In FIG. 6, the means for comparing a signal-to-noise ratio against a mean and variance is depicted as comparator 224 wherein the signal-to-noise ratio mean and variance is compared against a measured signal-to-noise ratio value. When a signal-to-noise ratio value is determined to exceed the signal-to-noise ratio mean and variance, a means for incrementing the signal-to-noise ratio deviation counter is employed. In FIG. 6, such a means in conjunction with a deviation accumulator is depicted as deviation counter 226 which may be implemented according to accumulating or counting techniques known by those of skill in the art. Statistical mobile detection process 220 yet comprises a deviation threshold means against which to compare the resident count with deviation counter 226. Such a means is depicted in FIG. 6 as deviation counter threshold 228 taking the form of a stored value from which calculated values are compared.

Figure 7:
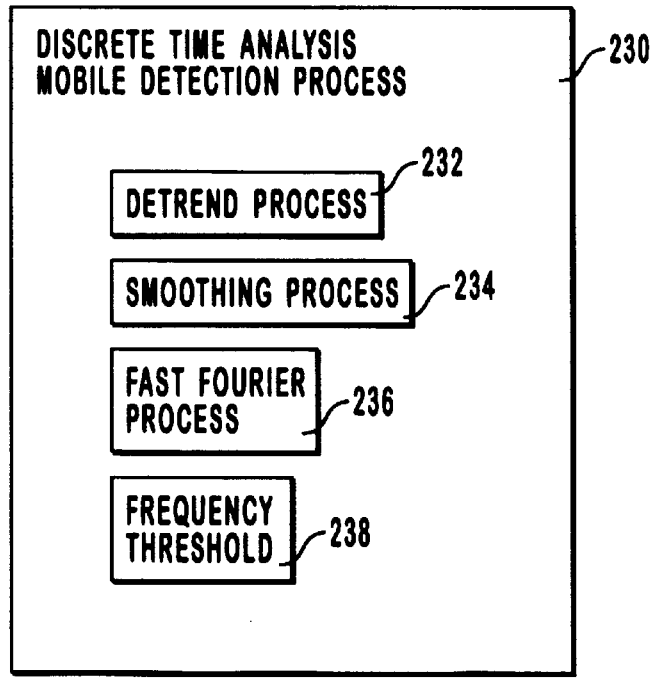
FIG. 7 is simplified block diagram of a discrete time analysis mobile detection process, in accordance a preferred embodiment of the present invention.

FIG. 7 depicts an alternate embodiment of a mobile detection process incorporating a discreet time analysis. In FIG. 6, discreet time analysis mobile detection process 230 is comprised of a means for detrending time domain signal-to-noise ratio measurements or values. By way of example, and not limitation, in FIG. 7 the means for detrending the time domain signal-to-noise ratio values is depicted as detrend process 232 and performs signal processing functions as described above for removing spurious elements of the discreet time series associated with the signal-to-noise ratio calculations. Discreet time analysis mobile detection process 230 further comprises a means for smoothing the detrended time domain signal-to-noise ratio values. In FIG. 7, the means for smoothing time domain signal-to-noise ratio values is depicted as a smoothing process 234 implemented, as other processes and modules of the present invention, as software modules capable of execution by the processor or controller. Discrete time analysis mobile detection process 230 further comprises a means for converting the discrete time domain signal-to-noise ratio values to a frequency domain signal-to-noise ratio value. In FIG. 7, such a means is depicted as a fast Fourier process 236 implemented as a software module for carrying out a fast Fourier transform. Those of skill in the art recognize methods for carrying out fast Fourier transforms in accordance with such a process of the present invention. Discrete time analysis mobile detection process 230 yet comprises a means for comparing the frequency domain signal-to-noise ratio against a frequency signal-to-noise ratio threshold to determine when the variations in the signal-to-noise ratio of the data received by the wireless capable modem exceeds such a threshold thereby signifying mobility of the wireless-capable modem. In FIG. 7, such a means and storage for a frequency threshold is depicted as a frequency threshold 238. Frequency threshold 238 comprises software processes for comparing such values, and, a buffer location for storage, such as in a table or other resident storage, of a frequency threshold value for use in evaluating the spectral components resulting from transformation of time domain variations to the frequency domain.

Figure 8:
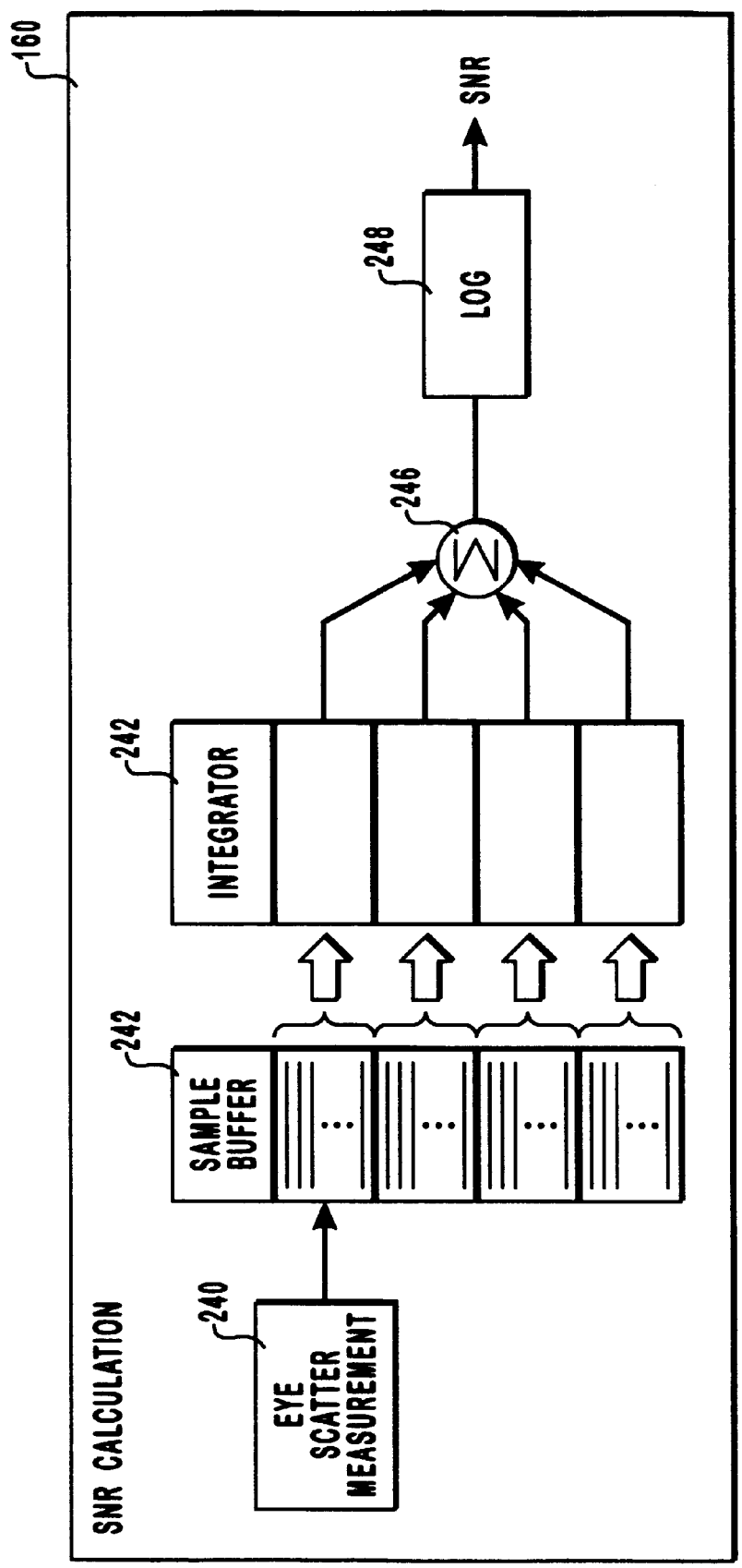
FIG. 8 is a simplified block diagram of a signal-to-noise ratio calculation process, in accordance a preferred embodiment of the present invention.

FIG. 8 depicts a simplified block diagram of the components and elements utilized in calculating a signal-to-noise ratio, in accordance with a preferred embodiment of the present invention. A signal-to-noise ratio calculation 160 is comprised of a means for measuring a plurality of eye scatter samples of data received by the wireless-capable modem. The means for measuring a plurality of eye scatter samples evaluates the errors associated with the received data and variation of subsequent samples. By way of example, and not limitation, in FIG. 8 the means for measuring a plurality of eye scatter samples is depicted as eye scatter measurement 240. Eye scatter measurement 240 is comprised of software modules necessary for evaluating and manipulating the received data.

Discrete time domain measurements of eye scatter samples are retained or stored in a sample buffer 242 wherein four sets of 480 samples are stored or processed for subsequent delivery to an integrator 242. Integrator 242 provides a means for integrating the plurality of eye scatter samples to form an integrated value. The integrated values, four in the preferred embodiment, are dispatched to a means for summing a plurality of the integrated values. In FIG. 8, the means for summing is depicted as summer 246 to form an eye log 2 value. Signal-to-noise ratio calculation 160 further comprises a means for converting the eye log 2 value to a signal-to-noise ratio value. In FIG. 8, the means for converting the eye log 2 value to signal-to-noise ratio is depicted as a logarithmic converter 248 for performing logarithmic transformation from an eye log 2 measurement to a signal-to-noise ratio value in a logarithmic scale.

The present invention may be embodied in other specific forms without departing from the spirit or essential characteristics. The described embodiments are to be considered in all respect only illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a data communication system employing a wireless-capable modem transceiving data at a determined data transfer rate via a wireless transceiver, a method for revising and minimizing renegotiations of said data transfer rate when variations to the mobility of said wireless-capable modem are detected, said method comprising the steps of:
   a) executing a mobility detection process to determine variations to a signal-to-noise ratio (SNR) of said data received by said wireless-capable modem;
   b) when said variations to said SNR exceed a mobility threshold, revising said data transfer rate from a stationary maximum data transfer rate to a mobile default data transfer rate to provide a sustained SNR during mobility of said wireless-capable modem; and
   c) when variations to said SNR do not exceed said mobility threshold, revising said data transfer rate to said stationary maximum data transfer rate capable by said wireless-capable modem.

2. The method as recited in claim 1, wherein said executing a mobility detection process step comprises the steps of:
   a) statistically selecting an SNR mean and variance for said stationary maximum data transfer rate;
   b) calculating said SNR of said data received by said wireless-capable modem; and
   c) comparing said SNR against said mean and variance for said stationary maximum data transfer rate to determine said variations to said SNR of said data received by said wireless-capable modem.

3. The method as recited in claim 2, wherein said comparing said SNR against said mean and variance step further comprises the steps of:
   a) when said SNR exceeds said mean and variance for said stationary maximum data transfer rate, incrementing an SNR deviation counter to sum successive deviations of said mean and variance for said stationary maximum data transfer rate;
   b) when said SNR deviation counter exceeds a count threshold, designating variations to said SNR to exceed said mobility threshold; and
   c) when said SNR deviation counter is stable for N seconds, designating said wireless-capable modem as not exceeding said mobility threshold.

4. The method as recited in claim 3, wherein said calculating said SNR of said data received by said wireless-capable modem step comprises the steps of:
   a) measuring a plurality of eye scatter samples of said data received by said modem;
   b) integrating said plurality of said eye scatter samples to form an integrated value;

c) summing a plurality of said integrated values to form an eye log 2 value; and d) convert said eye log 2 value to said SNR.

5. The method as recited in claim 1, wherein said executing a mobility detection process step comprises the steps of:

a) calculating a discrete time domain SNR of said data received by said wireless-capable modem;

b) converting said discrete time domain SNR to a frequency domain SNR; and c) comparing said frequency domain SNR against a high frequency SNR threshold to determine said variations to said SNR of said data received by said wireless-capable modem.

6. The method as recited in claim 5, wherein said comparing said frequency domain SNR against a high frequency SNR threshold step further comprises the steps of:

a) when said SNR exceeds said high frequency threshold, designating variations to said SNR to exceed said mobility threshold; and b) when said SNR does not exceed said high frequency threshold, designating said wireless-capable modem as not exceeding said mobility threshold.

7. The method as recited in claim 6, wherein said calculating said SNR of said data received by said wireless-capable modem step comprises the steps of:

a) measuring a plurality of eye scatter samples of said data received by said modem;

b) integrating said plurality of said eye scatter samples to form an integrated value;

c) summing a plurality of said integrated values to form an eye log 2 value; and d) converting said eye log 2 value to said SNR.

8. The method as recited in claim 5, wherein said calculating a time domain SNR of said data received by said wireless-capable modem step further comprises the steps of:

a) detrending said time domain SNR; and b) smoothing said domain SNR.

9. A wireless-capable modem for transceiving data via a wireless transceiver and capable of revising and minimizing renegotiations of a data transfer rate in response to variations in the mobility of said wireless-capable modem, comprising:

a) a mobility detection process to determine variations to a signal-to-noise ratio (SNR) of said data received by said wireless-capable modem; and b) a data transfer rate negotiation process for revising said data transfer rate from a stationary maximum data transfer rate to a mobile default data transfer rate to provide a sustained SNR during mobility of said wireless-capable modem when said variations to said SNR exceed a mobility threshold, and when variations to said SNR do not exceed said mobility threshold, said data transfer rate negotiation process for revising said data transfer rate to said stationary maximum data transfer rate capable by said wireless-capable modem.

10. The wireless-capable modem as recited in claim 9, wherein said mobility detection process comprises:

a) means for statistically selecting an SNR mean and variance for said stationary maximum data transfer rate;

b) means for calculating said SNR of said data received by said wireless-capable modem; and c) means for comparing said SNR against said mean and variance for said stationary maximum data transfer rate to determine said variations to said SNR of said data received by said wireless-capable modem.

11. The wireless-capable modem as recited in claim 10, wherein said means for comparing said SNR against said mean and variance further comprises:

a) means for incrementing an SNR deviation counter to sum successive deviations of said mean and variance for said stationary maximum data transfer rate when said SNR exceeds said mean and variance for said stationary maximum data transfer rate; and b) means for designating variations to said SNR to exceed said mobility threshold when said SNR deviation counter exceeds a count threshold, and for designating said wireless-capable modem as not exceeding said mobility threshold when said SNR deviation counter is stable for N seconds.

12. The wireless-capable modem as recited in claim 11, wherein said means for calculating said SNR of said data received by said wireless-capable modem comprises:

a) means for measuring a plurality of eye scatter samples of said data received by said modem;

b) means for integrating said plurality of said eye scatter samples to form an integrated value;

c) means for summing a plurality of said integrated values to form an eye log 2 value; and d) means for converting said eye log 2 value to said SNR.

13. The wireless-capable modem as recited in claim 9, wherein said mobility detection process comprises:

a) means for calculating a discrete time domain SNR of said data received by said wireless-capable modem;

b) means for converting said discrete time domain SNR to a frequency domain SNR; and c) means for comparing said frequency domain SNR against a high frequency SNR threshold to determine said variations to said SNR of said data received by said wireless-capable modem.

14. The wireless-capable modem as recited in claim 13, wherein said means for comparing said frequency domain SNR against a high frequency SNR threshold further comprises a means for designating variations to said SNR to exceed said mobility threshold when said SNR exceeds said high frequency threshold, and designating said wireless-capable modem as not exceeding said mobility threshold when said SNR does not exceed said high frequency threshold.

15. The wireless-capable modem as recited in claim 13, wherein said means for calculating said SNR of said data received by said wireless-capable modem comprises:

a) means for measuring a plurality of eye scatter samples of said data received by said modem;

b) means for integrating said plurality of said eye scatter samples to form an integrated value;

c) means for summing a plurality of said integrated values to form an eye log 2 value; and d) means for converting said eye log 2 value to said SNR.

16. The wireless-capable modem as recited in claim 13, wherein said means for calculating a time domain SNR of said data received by said wireless-capable modem further comprises:

a) means for detrending said time domain SNR; and b) means for smoothing said domain SNR.

17. In a data communication system employing a wireless-capable modem transceiving data at a determined data transfer rate via a wireless transceiver, a method for continuously detecting variations to the mobility of said wireless-capable modem, said method comprising the steps of:

(a) continuously monitoring variations to a signal-to-noise ratio (SNR) value of a data signal being received by the wireless-capable modem;

(b) identifying at least one mobility threshold boundary that indicates that a wireless-capable modem is in a mobile state;

(c) comparing the monitored variations to the SNR value to the mobility threshold boundary; and (d) if the monitored variations to the SNR value exceeds the SNR threshold, determining that the wireless-capable modem is in a mobile state.

* * * * *